June 11, 1963
D. C. HULL
3,093,640
NITROLYSIS OF HEXAMINE
Filed July 16, 1943
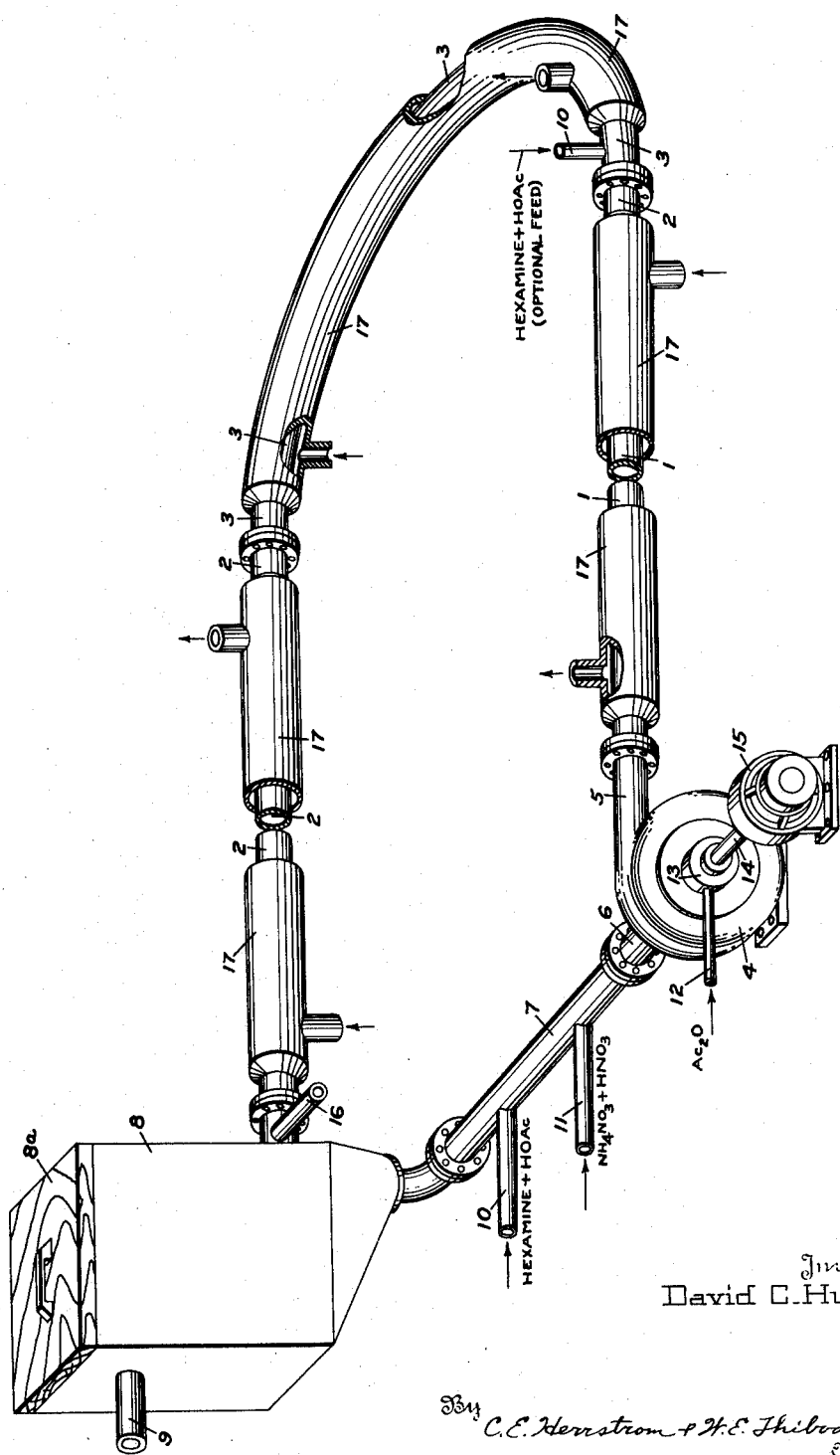
Inventor
David C. Hull
By C.E. Herrstrom & W.E. Thibodeau
Attorneys

United States Patent Office 3,093,640
Patented June 11, 1963

3,093,640
NITROLYSIS OF HEXAMINE
David C. Hull, Kingsport, Tenn., assignor, by mesne assignments, to the United States of America as represented by the Secretary of War
Filed July 16, 1943, Ser. No. 495,083
7 Claims. (Cl. 260—248)

The present invention relates to the manufacture of chemical products of the type produced by reactions which take place in a relatively short period of time with the production of a liquid reaction mixture which may or may not contain a solid product in addition to a liquid. More particularly, the invention is concerned with a new and improved method of carrying out nitrolysis or nitration reactions, as for example, in the manufacture of high explosives such as cyclonite.

The object of the present invention is to provide a new and improved process and apparatus for the continuous production of chemical products of the type indicated above.

A more particular object is the provision of an apparatus of the character described which is adaptable to chemical processes of the type having a relatively large heat of reaction (either endothermic or exothermic) and which produce in a short period of time after the mixing of the reactants, a fluid reaction mixture consisting of a solid reaction product suspended in a mother liquor.

A further object is to provide a new and improved continuous method and apparatus for carrying out nitrolysis reactions, for example, in the manufacture of hexamine dinitrate, cyclonite and similar compounds.

Another object is to minimize the hazards involved in the continuous production of high explosives such as cyclonite.

Other objects and advantages will become apparent as the invention is hereinafter more particularly described.

In order clearly to disclose the nature of the present invention it will be helpful to select a specific example of the type of chemical process to which the present process and apparatus are especially adaptable. For this purpose, a typical nitrolysis reaction as carried out in accordance with the present invention will hereinafter be described, it being understood, however, that this is done solely by way of example, and not for the purpose of delimiting the scope or utility of the invention.

To illustrate the type of nitrolysis reaction to which the invention is especially adapted, the manufacture of cyclonite will be selected. This compound (cyclotrimethylenetrinitramine) is an explosive of great power and brisance which may be produced by the so-called "combination process" more particularly described and claimed in the copending application of W. E. Bachmann, U.S. Serial No. 495,078, now U.S. Patent 2,798,870, filed of even date herewith. According to this method, a hexamine compound (e.g., hexamine itself or one of its salts such as the dinitrate) is treated at about 60 to 70° C. with an ammonia donor (e.g. $NH_4NO_3$) and nitric acid, in the presence of a fatty acid anhydride such as acetic anhydride, according to the overall Equation 2 or 3:

(2) Hexamine+$2NH_4NO_3$+$4HNO_3$+$6(CH_3CO)_2O$
= 2 cyclonite+$12CH_3COOH$
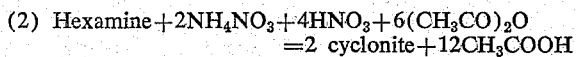
(3) Hexamine dinitrate+$2NH_4NO_3$+$2HNO_3$
+$6(CH_3CO)_2O$=2 cyclonite+$12CH_3COOH$
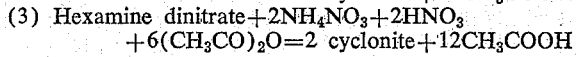

Now, it is characteristic of nitrolysis reactions in general and of the Bachmann "combination process" in particular that the reaction takes place in a very short period of time, with a relatively large exothermic heat of reaction. As is also characteristic of nitrolysis reactions, in the "combination process," optimum yields of cylonite can be obtained only if the reaction temperature is carefully controlled and only if the proportions of retactants are maintained fairly constant throughout the course of the reaction. With batch operations, accurate temperature control is somewhat difficult because of the relatively large exothermic heat of reaction. However, a greater difficulty arises from the fact that the composition of the reaction mixture progressively changes over a considerable range during the period of time that the reactants are being charged to the batch reaction vessel. These and other disadvantages of the batch method of carrying out nitrolysis reactions such as the "combination process" may be obviated by the method and apparatus of the present invention.

A preferred embodiment of the present invention is shown in perspective in the accompanying drawing.

Referring particularly to the drawing, the apparatus comprises an elongated, confined flow path of restricted cross section consisting of two straight sections of conduit 1 and 2 connected by a suitable return bend 3. The conduit may desirably consist of Pyrex tube of suitable diameter, the return bend being constructed of corrosion resisting material such as stainless steel or the like. A stainless steel centrifugal pump 4 is connected (through the discharge side 5) to one end of the conduit 1. The suction side 6 of the pump 4 is connected through conduit 7 to the lower portion of a vapor separating vessel 8, which, as shown, may consist of a box-shaped stainless steel chamber having an open top with a loosely fitting wooden cover 8a, to permit the escape, to the atmosphere, of any gas evolved during the reaction. The conduit 2 forming the down-stream or discharge end of the elongated flow path is connected to the vapor separator 8, discharging the reaction mixture at an intermediate level therein. In the upper part of the separator 8 is an overflow conduit 9 through which excess fluid may flow from the system.

Suitable liquid-feed charge lines 10 and 11 are provided in conduit 7. An optional charge line 10 is provided at the up-stream end of return bend 3. A third liquid-feed charge line 12 is connected to the pump 4 through the stuffing box 13 surrounding the driving shaft 14 of the motor 15, the third liquid-feed constantly sweeping any explosive material from the stuffing box 13 on the pump 4, thereby minimizing any explosion hazards. Where one or more of the feeds are solids (e.g., solid hexamine or solid ammonium nitrate) the material may be charged through the open top of the vapor separator 8, in which event the reaction mixture is desirably bled from the system at the discharge end of the conduit 2 through an alternate discharge conduit 16 located at a point upstream from the separating zone.

In order to control the reaction temperature, the straight sections of conduit 1 and 2 and desirably also the return bend 3 are provided with suitable jackets 17 through which a heat exchange medium such as water is circulated at the proper temperature. If desired, temperature responsive devices (not shown) may be inserted in suitable wells (not shown) at various points along the path.

In order still more clearly to disclose the nature of the present invention, a specific example showing the use of the foregoing system in carrying out an "all-liquid-feed" modification of the Bachmann "combination process," will hereinafter be described in detail. It should be understood however that this is done solely for illustrative purposes and is not to be construed as a limitation upon the spirit and scope of the appended claims.

*Example*

A hexamine solution is prepared by dissolving 153 pounds of hexamine in 250 pounds of 99.9% glacial acetic acid. The solution is preferably cooled to 20° C. and may conveniently be charged to a constant level overhead supply tank (not shown). A second liquid feed is prepared by dissolving 60 parts by weight of ammonium nitrate in 75 parts by weight of concentrated (98%) nitric acid. The oxides of nitrogen evolving during the preparation of this solution are permitted to escape and the clear water-white solution may conveniently be charged to a second constant level overhead supply tank (not shown). A third liquid feed, consisting of acetic anhydride, may likewise be charged to a third constant level overhead supply tank (not shown).

The three liquid feeds are fed from the three supply tanks (not shown) into the reactor. The hexamine solution is preferably metered at 24° C. at the rate of 0.78 pound per minute and enters the reactor through either one of the charge lines 10. The acetic anhydride is also desirably metered at 24° C. and enters the reactor through the charge line 12 preferably at a rate equal to 6.209 times the rate of hexamine solution feed. In a similar manner the ammonium nitrate-nitric acid solution may be metered at 30° C. and fed to the suction side of the pump through 11, preferably at a rate of 3.921 pounds per pound of hexamine solution feed. The pump 4 is operated at a rate sufficient to effect turbulent flow of the liquid in the system, a flow velocity of 10 feet per second generally being satisfactory for the instant reaction.

The incoming ammonium nitrate-nitric acid solution becomes thoroughly mixed in the flow path with the acetic anhydride during the period required for the liquid to pass substantially through the cycle in the reactor, before meeting the incoming hexamine solution introduced through line 10. The reaction mixture flowing through the system passes into the overflow chamber 8 where a small percent of the total volume of the liquid in the system continuously overflows through the conduit 9. The suspension of cyclonite in the mother liquid overflowing through 9 is caught in a hold-up tank (not shown) for processing in any desired manner, for example, in accordance with the procedure described and claimed in the copending application of W. E. Bachmann, Serial No. 495,079, now U.S. Patent 2,680,671, filed of even date herewith.

Feed control is effected by metering at a constant rate. After the feeds are set at the desired rate, the temperature of the reaction (e.g., 60–70° C.) is maintained constant by controlling the temperature of the water flowing through the water jackets 17.

Certain features of the "all-liquid-feed" modification of the "combination process" described above are claimed in the copending application of George F. Wright, Douglas C. Downing and Henry H. Richmond, U.S. Serial No. 495,082, now U.S. Patent 2,434,879, filed of even date herewith.

The apparatus described above possesses a number of important advantages. Thus, for example, the system is very flexible, and the productive capacity may be increased within considerable limits, for example, by increasing the length of the flow path or by altering the charging rates or both. This flexibility in capacity constitutes a distinct advantage over batch methods. A further advantage arises from the refinement in control made possible by the described process. Because of the large volume of liquid constantly being recycled in the system (compared to the volume of liquid being discharged) and also because of the charging technique described above, the composition of the reaction media (essentially mother liquor) is maintained practically constant during the short period required for the reaction. By adjustment of the liquid feeds the reactants may be fed at any desired ratio, for example, in substantially stoichiometric proportions, so that high yields of high quality product may be obtained. The method of charging the anhydride through the stuffing box, and the relatively small quantity of explosive in the system at any given moment, reduce the explosion hazard to a minimum.

Still another advantage of the system arises from the ease with which the reactor may be rid of the cyclonite scale or deposit which may gradually build up on the walls of the vessel during use. This encrusted cyclonite (which of course reduces the efficiency of the cooling system) may be removed merely by cutting off all feeds to the reactor and with the reaction mixture circulating as in normal operation, raising the temperature thereof to above about 80° C. (for example, to about 90–100° C.), by passing steam or hot water through the heat exchange jackets 17. By holding the circulating reaction mixture at 90–100° C. for about 1 to 2 hours, the deposited cyclonite will become loosened by partial solution in the mother liquor and scale-off. Thereafter the reaction mixture may be cooled to the selected on-stream operation temperature, and the feeds then resumed. Thus, in a relatively short time, the walls of the reactor may be periodically "de-scaled," without affecting the composition of the mother liquor.

It will be apparent from the foregoing specific example that the process and apparatus as illustratively described are capable of modification to suit a wide range of operation conditions and to adapt the invention to a wide variety of chemical processes. Thus, the process and apparatus may readily be applied to the production of nitration or nitrolysis products other than cyclonite, for example, in the manufacture of hexamine dinitrate from hexamine and 70% nitric acid; or generally in the formation of nitramines from amines and nitric acid or for other rapid reactions which have large endothermic or exothermic heats of reaction. Many other specific applications will be apparent to those skilled in the art and all such modifications are within the scope of the invention. I therefore intended to be limited only in accordance with the following patent claims.

I claim:

1. In the manufacture of cyclonite by the treatment of a hexamine compound, an ammonia donor and a nitrate ion donor under conditions effecting the elimination of elements of water with the production of solid cyclonite and a mother liquor, the improvement which comprises, maintaining a stream of said mother liquor containing suspended cyclonite continuously flowing in a confined flow path of restricted cross section; continuously circulating said flowing stream through a vapor separating zone communicating with the atmosphere; continuously charging said donors to said flowing stream at seelcted points downstream from said vapor separating zone; and continuously withdrawing a portion of the mother liquor containing suspended cyclonite at a discharge point upstream from said charging points.

2. In the manufacture of cyclonite by the treatment of a hexamine compound with an ammonia donor, nitric acid and a fatty acid anhydride under conditions effecting the production of solid cyclonite suspended in a mother liquor, the improvement which comprises, maintaining a stream of said mother liquor containing suspended cyclonite continuously flowing in a confined flow path of restricted cross section; continuously circulating said flowing stream through a vapor separating zone communicating with the atmosphere; continuously charging said hexamine compound, said ammonia donor, said nitric acid and said anhydride to said flowing stream at a selected charging zone in said flow path; and continuously withdrawing a portion of said mother liquor containing suspended cyclonite, at a discharge zone upstream from said charging zone.

3. The improvement of claim 2, wherein said portion of mother liquor is withdrawn from said flowing stream in said vapor separating zone.

4. In the manufacture of cyclonite by the treatment of hexamine with ammonium nitrate, nitric acid and acetic anhydride under conditions effecting the production of solid cyclonite suspended in a mother liquor, the improvement which comprises, maintaining a turbulently flowing stream of said mother liquor containing the cyclonite suspended therein continuously flowing in an elongated, confined flow path of restricted cross section; continuously circulating said flowing stream through a vapor separating zone openly communicating with the atmosphere; continuously charging to said stream, at separated, selected charging points downstream from said vapor separating zone, (1) a solution of said hexamine in a substantially anhydrous liquid fatty acid, (2) a solution of said ammonium nitrate in said nitric acid, and (3) said acetic anhydride; and continuously withdrawing a portion of said mother liquor containing the suspended cyclonite at an overflow zone upstream from the charging points.

5. In the manufacture of cyclonite by the interaction of three liquids consisting of (1) a solution of hexamine in glacial acetic acid, (2) a solution of ammonium nitrate in nitric acid and (3) acetic anhydride under conditions effecting the production of solid cyclonite suspended in a mother liquor, the improvement which comprises maintaining a turbulently flowing stream of said mother liquor containing suspended cyclonite continuously flowing in an elongated, confined flow path of restricted cross section; continuously circulating said flowing stream through a vapor separating zone openly communicating with the atmosphere; continuously charging said three liquids to said flowing stream at three separate charging points downstream from said vapor separating zone, and continuously withdrawing a portion of said mother liquor containing suspended cyclonite at a zone upstream from said charging points.

6. The method of claim 5, wherein said mother liquor containing the suspended cyclonite is continuously withdrawn from said vapor separating zone.

7. The improvement of claim 5, wherein said ammonium nitrate solution and said acetic anhydride are separately charged to said stream at points upstream from the point at which said hexamine solution is introduced into said stream.

References Cited in the file of this patent

UNITED STATES PATENTS

| | | |
|---|---|---|
| 1,283,365 | Trent | Oct. 29, 1918 |
| 1,967,667 | Hass et al. | July 24, 1934 |
| 2,161,475 | Landon | June 6, 1939 |
| 2,206,813 | Hass et al. | July 2, 1940 |
| 2,208,934 | Meissner | July 23, 1940 |
| 2,274,630 | Ellis | Feb. 24, 1942 |
| 2,332,527 | Pyzel | Oct. 26, 1943 |
| 2,434,879 | Wright et al. | Jan. 20, 1948 |